United States Patent [19]

McKinney

[11] 4,029,051
[45] June 14, 1977

[54] ANIMAL FEEDING AND PROTECTIVE DEVICE

[76] Inventor: Roy L. McKinney, 3000 Bird Ave., Coconut Grove, Fla. 33133

[22] Filed: July 14, 1975

[21] Appl. No.: 595,908

Related U.S. Application Data

[63] Continuation-in-part of Ser. No. 443,458, Feb. 19, 1974, abandoned.

[52] U.S. Cl. ................................. 119/52 R; 119/61
[51] Int. Cl.² ............................................ A01K 5/00
[58] Field of Search ............. 119/52 R, 63, 52 AF, 119/53, 52 A, 61, 51 R, 53.5; 43/131

[56] References Cited

UNITED STATES PATENTS

| | | | |
|---|---|---|---|
| 962,635 | 6/1910 | Griner | 119/53 |
| 1,075,855 | 10/1913 | Riley et al. | 119/53 |
| 1,638,270 | 8/1927 | Nilsson | 119/52 R |
| 2,781,607 | 2/1957 | Smiley | 43/131 |
| 2,944,364 | 7/1960 | Kelly | 119/52 R X |
| 3,788,279 | 1/1974 | Boehland, Jr. | 119/52 R |
| D23,396 | 6/1894 | Davis | 119/52 R |

Primary Examiner—J.N. Eskovitz
Attorney, Agent, or Firm—Caesar, Rivise, Bernstein & Cohen, Ltd.

[57] ABSTRACT

An animal feeding and protective device comprising a housing with side walls enclosing a space adapted to receive a feeding dish for an animal. There is an access opening in one of the side walls so that the animal can reach the feeding dish. The side walls are preferably inclined at an acute angle for reception of a food dispenser which also has inclined sides, with the food dispenser being supported along the upper edge of the device. A lid is provided to prevent unauthorized access by an unauthorized animal. The preferred version of the invention is for use by a cat, although the invention clearly can be used by other small animals, effectively to prevent the taking of food by larger animals to the deprivation of the small animal.

5 Claims, 5 Drawing Figures

ANIMAL FEEDING AND PROTECTIVE DEVICE

This application is a continuation-in-part-application based on copending application Ser. No. 443,458 filed Feb. 19, 1974 and now abandoned.

The present invention relates to an animal feeding and protective device and more particularly related to a new and improved device of this general class.

It is known to provide trap-like devices containing a bait which induces the animal to place its head or other part of its body within a confined area for purpose of either catching the animal or administering poison or other noxious substance to the animal. However, while such devices normally involve a housing of some type, such devices have not been used to obtain positive results; namely, the feeding of animals.

While the feeding of animals is at first glance thought to be a simple process, nevertheless there are problems that are reluctantly tolerated by pet lovers. There is the usual odor given off by many foods which often lead to the placement of a pet food in another room or confined area away from the members of the household. Another problem involves a household having two or more animals wherein a larger animal will take away food intended for a smaller animal. Yet another problem involves keeping the pet feeding area clean.

All of the foregoing problems have been reluctantly tolerated by owners of pets.

It is accordingly an object of this invention to provide an animal feeding protective device which overcomes all the foregoing problems in the provision of an attractive device of relatively low cost.

In particular, the foregoing objects are achieved by providing in the preferred embodiment a housing with inclined sides and an integral floor, all of a transparent plastic with the upper end of the housing being opened, but adapted to be covered with a removable lid. One of the sides of the housing has an access opening and there is also a food dispenser provided to be held within the housing, with the food dispenser having a discharge opening whereby food can fall by gravity into a feeding dish positioned on the floor of the housing.

Other advantages of the invention will become readily apparent by reference to the following figures of the drawing.

Figure 1:
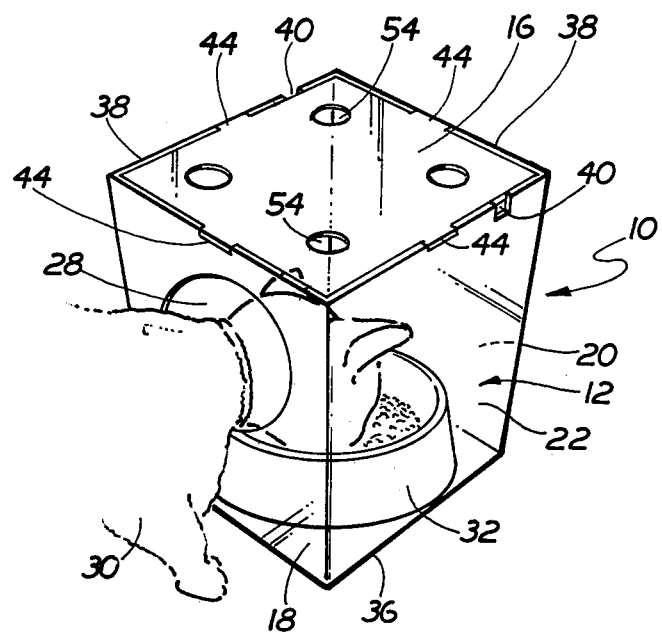
FIG. 1 is a three-dimensional view showing the fully assembled animal feeding and protective device of the present invention.
Figure 4:
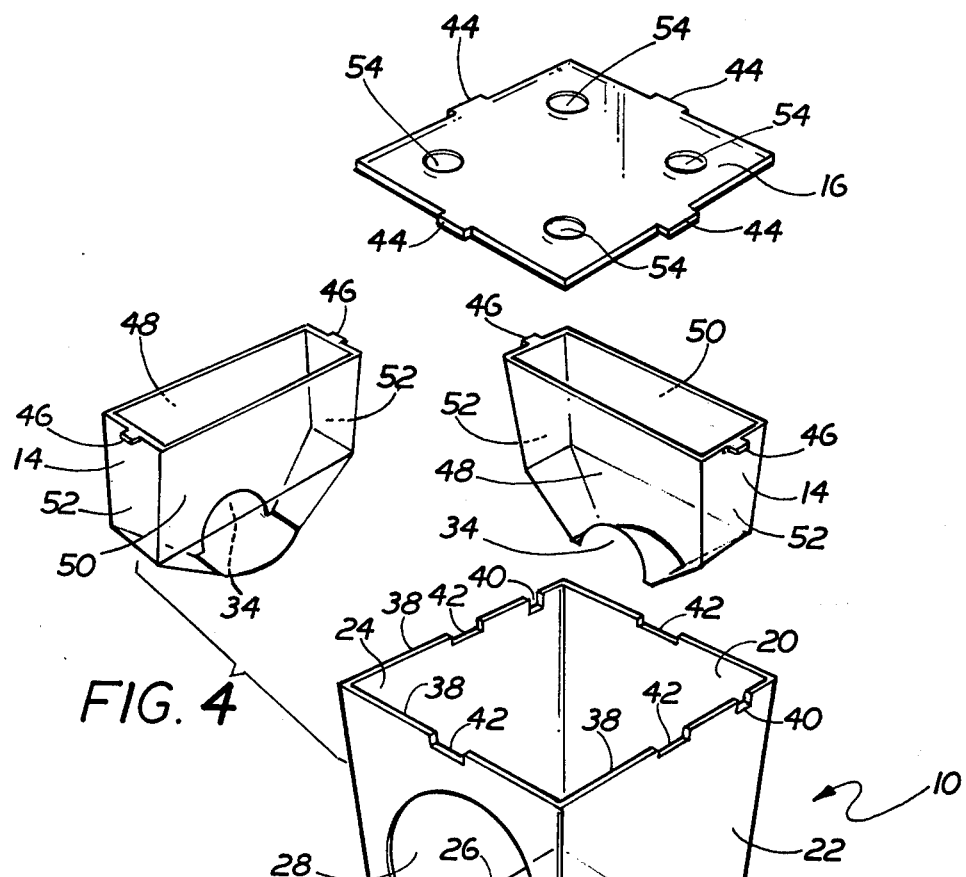
FIG. 4 is an exploded, three-dimensional view showing the food dispensing device of the present invention with separate views of the dispenser.

Referring now to the various figures of the drawing wherein like reference characters refer to like parts, there is shown at 10 in FIG. 1 an animal feeding and protective device embodying the present invention. Reference is also made to FIG. 4 which shows three important components of the invention; namely, housing 12, dispenser 14 and lid 16.

The housing basically comprises (FIG. 4) front wall 18, rear wall 20, side walls 22 and 24 and floor 26. The upper end of the housing 12 is open for reception of dispenser 14 and lid 16 as will be discussed hereinafter.

The housing 12 also posses access opening 28 for use by the animal in FIGS. 1. and 2.

Figure 3:
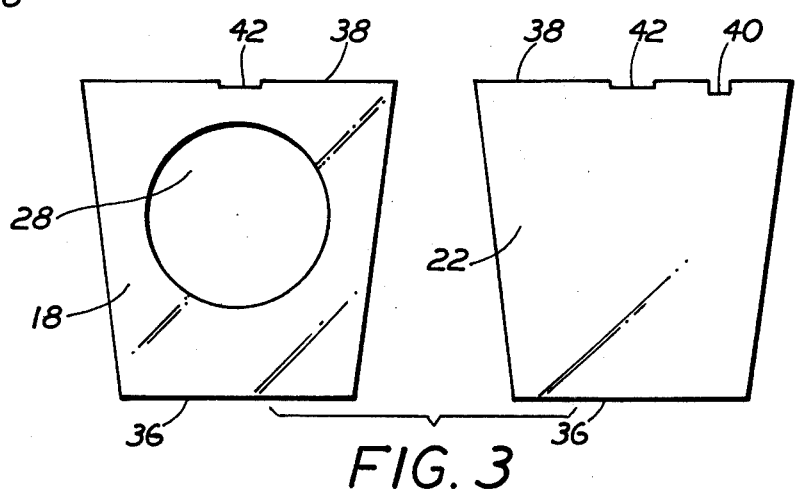
FIG. 3 shows two elevations of various sides of the device of FIG. 1.
Figure 5:
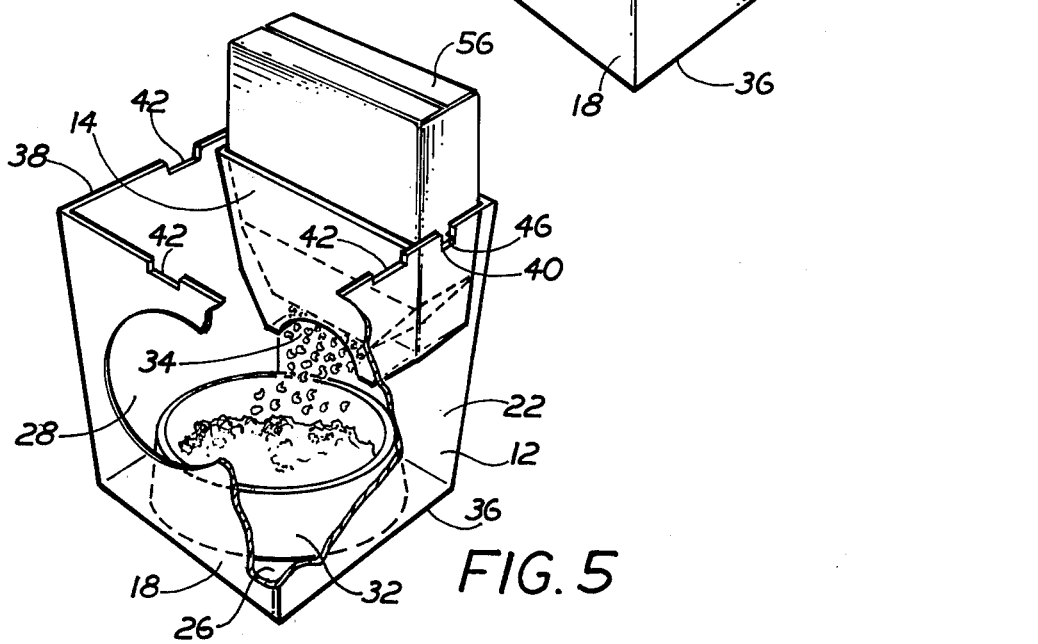
FIG. 5 is similar to FIG. 1 but is exploded and also shows a food package in place.

An important aspect of the invention involves the slope or inclination of at least one of the various walls as indicated by reference to FIG. 3. The left-hand view of FIG. 3 is an elevation looking into front wall 18 and showing the inclination of side walls 22 and 24 at an acute angle. A preferred, acute angle of inclination is 7° although the angle can be greater to as much as 30° or more. This inclination of walls assists in the maintaining of dispenser 14 in a position above floor 26 as shown in FIG. 5. In this way the contents of the dispenser 14 (which also has inclined walls) can be dispensed directly into feeding dish 32 with the dispensing mouth 34 of the dispenser 14 always being physically located above the feeding dish 32. There can be actual contact between the dispenser and the side walls and there are also tabs 46 as will be discussed hereinafter.

The right-hand view of FIG. 3 is an elevation looking at side wall 22. This view shows the inclination of front wall 18 and rear wall 20.

In a preferred embodiment of the invention each of the four walls have identically the same dimensions with a width of 6¼ inches at the lower edge 36 and a width of 8½ inches at the upper edge 38.

Also shown in FIG. 4 are certain notches formed in the upper edges of the walls for reception of the dispenser 14 and the lid 16. Each side wall has formed centrally in upper edge 38 a notch 42 for reception of one of the tabs 44 of lid 16. Also, there is formed in the upper edge 38 of the side walls 22 and 24 additional notches 40 for reception of tabs 46 of dispenser 14.

The dispenser 14 has a front face 48 and a rear face 50 with inclined side walls 52. The inclination of the side walls 52 is the same or slightly greater than the inclination of 22 and 24 of housing 12 so that the walls 52 will rest against walls 22 and 24. In this way the dispenser 14 can be placed within housing 12, such that tabs 46 of the dispenser 14 rest in notches 40 as can be best seen in FIGS. 1 and 2 and the dispenser contact the housing. Also, the dispensing mouth 34 of the dispenser 14 will be positioned immediately above the feeding dish 32 as seen in FIG. 5.

The lid 16 has the tabs 44 as previously discussed in connection with FIG. 4. Also, lid 16 has openings 54 for grasping purposes to aid the placement or removal of the lid by hand.

The lid 16 sets flush on upper edge 38 of the walls of housing 12 with tabs 44 of the lid 16 being received in notches 42 in the upper edges 38 of the side walls of the housing 12.

In order to fill the dispenser 14, lid 16 is removed and a package 56 of food can be received directly in 34 as shown in FIG. 5.

The inclination of the side walls at an acute angle serves not only to assist in the maintenance of the position of dispenser 14, but also assists the manufacturer or even the user in stacking a plurality of housings. It is preferred that the inclination be in a downward direction since this will have a tendency to offer or present the interior of the housing more readily to the animal. In this connection, the animal will be able to smell as well as see the food because of access opening 28 and also because the invention is preferably made of transparent plastic. This is significant since animals, particularly cats, have an instinct of wanting to be able to look around from time to time while eating. The transparent nature of the invention allows such observation and surveilance during the eating process.

A preferred plastic is polypropylene, although other transparent plastics like polystyrene or acrylics may be utilized. Also, the plastic nature of the device lends to its sanitary appearance and ease of cleaning. For instance, the housing, the food dispenser and the lid may be each separately positioned in an automatic dishwashing machine and will emerge shining clean.

Figure 2:
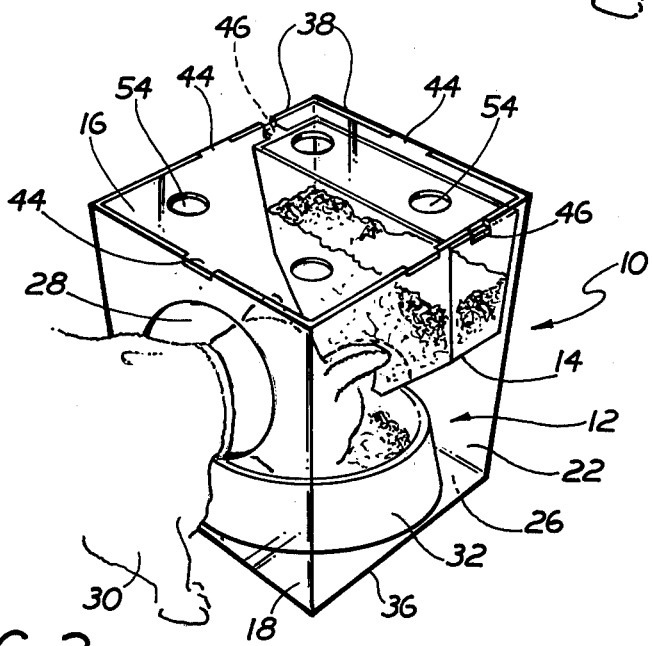
FIG. 2 is similar to FIG. 1 but shows the dispenser in place.

The food dispenser 14 can readily be filled with a package in a manner of FIGS. 1 and 2, or the package can be allowed to remain in actual contact with the food dispenser as seen in FIG. 5 for longer feeding. In either event, the inclined edges of the food dispenser and the particular shaping of its discharge opening for a continuing feeding to the animal at controllable rates over a period of time without the intervention of a person.

From the foregoing it is seen that there is provided by the present invention an animal feeding and protective device which is both sanitary and pleasant in appearance. Any undesirable odors of animal food are generally kept within the device, but the interior of the device is readily viewable in view of its transparent nature. The device is attractive to the animal in view of its shaping and inclined edges, and the device is also attractive in use. Furthermore, the animal will readily use the device since its transparent nature enables it to view the surrounding area during the feeding process.

Without further elaboration, the foregoing will so fully illustrate my invention that others may, by applying current or future knowledge, readily adapts the same for use under various conditions of service.

What is claimed as the invention is:

1. An animal feeding and protective device comprising a transparent housing having a floor, upwardly extending side walls from said floor enclosing a space, a feeding dish for an animal in said space and on said floor, a dispenser for food positioned at least partially within said space and above said feeding dish, food contained in said dispenser and passing by gravity into said dish from said dispenser, an access opening located above said floor and closely adjacent to said feeding dish, said access opening being in one of said side walls and being sufficiently small to allow said animal to bring its head to said feeding dish for feeding purposes, but to prevent the animal from otherwise entering said housing, and the space between said side walls being essentially closed at the top by a removable cover to maintain within said space any odor from food in the food dish and prevent animal access from the top, said side walls being inclined convergingly downwardly at an acute angle, said food dispenser having at least one side inclined at esstentially the same acute angle whereby said food dispenser is matingly supported against one of said inclined side walls and above said feeding dish.

2. The animal feeding and protective device of claim 1 wherein there are four substantially equal side walls integral with said floor.

3. The animal feeding and protective device of claim 1 wherein said acute angle ranges from 60° to 83°.

4. The animal feeding and protective device of claim 1 wherein said housing has upper edges, notches formed in said upper edges, said food dispenser having tabs that are received in said notches to further support said food dispenser above said feeding dish.

5. The animal feeding and protective device of claim 1 wherein said cover has an opening for hand-grasping purposes.

* * * * *